Patented May 1, 1928.

1,668,039

UNITED STATES PATENT OFFICE.

JOHN ALLEN, OF GREENSBURG, INDIANA, ASSIGNOR OF ONE-HALF TO IRA J. HOLLENSBE, OF GREENSBURG, INDIANA.

PROCESS OF PREPARING FOWLS FOR PLUCKING.

No Drawing.   Application filed September 20, 1927.   Serial No. 220,851.

The invention has for its object the only efficient combination of time and temperature in the process of dipping fowls to secure the best results in removing the feathers and leaving the flesh and the meat in a clean and flawless condition to meet the maximum market price.

A further object of my invention is to provide a process for preparing fowls for plucking which is adapted to render the flesh so that all feathers, pin feathers, and dirt can expeditiously be removed from fowls in a single operation.

A further object of my invention is to provide a process for preparing fowls for cleaning which is adapted to render the flesh so that all feathers and dirt can be removed without injuring the flesh.

A further object of my invention is to provide a process of preparing fowls for plucking which will permit the fowls to be picked at once or may be picked with ease a few hours later.

A further object of my invention is to provide a process of preparing fowls for plucking which is simple and efficient in its operation.

A further object of my invention is to provide a process of sterilizing feathers while still on the fowls so that they may be placed in commercial use as soon as removed from the fowls.

A further object of my invention is a process which will enable me to put into practical operation my mechanical Patent Number 1,637,096.

Heretofore it has been customary to subject the carcass of the fowls to dry picking or preliminary scalding. Not only are these methods slow and expensive in operation but the carcass is liable to be bruised or torn with consequent injury to the skin or meat and a depreciation in the market price if not a total loss.

The fowls are agitated, preferably dipped with an up and down motion, to allow the water to penetrate to the very roots of the feathers, for 30 to 36 seconds in a tank of water kept at the uniform temperature of 120 to 130 degrees Fahrenheit. The most efficient results are obtained by undulating the fowls for 34 seconds in water kept at a uniform temperature of 126 degrees Fahrenheit.

In the foregoing, I have described the best method of carrying my process into operation, developed during the course of fifteen years of experimenting, and as has resulted from actual practice been found highly satisfactory in obtaining the desired results. It will be obvious however, that other liquids may be adapted; and that various changes in the manner of agitating the fowls may be resorted to by those skilled in the art without departing from the spirit and scope of the invention.

What I claim is:

1. The process of preparing fowls for plucking which consists in undulating the fowls in water at a temperature of 126 degrees Fahrenheit for 34 seconds.

2. The process of preparing fowls for plucking which consists in treating the fowls in water at a temperature of substantially 126 degrees Fahrenheit for substantially 34 seconds.

3. The process of preparing fowls for plucking which consists in undulating the fowls in water at a temperature from 125 to 127 degrees Fahrenheit for 33 to 35 seconds.

4. The process of preparing fowls for plucking which consists in treating the unplucked fowl in liquid at a temperature of less than 130 degrees Fahrenheit for a predetermined short period of time.

5. The process of preparing fowls for plucking which consists in semi-scalding said fowls in a liquid at a temperature of from 125 to 127 degrees Fahrenheit for a period of 33 to 35 seconds.

6. The process of preparing fowls for plucking which consists in semi-scalding unplucked fowls in a liquid maintained at a temperature of 126 degrees Fahrenheit for a period of 34 seconds.

JOHN ALLEN.